United States Patent Office 3,428,601
Patented Feb. 18, 1969

3,428,601
METHOD OF CONVERTING AN EPOXY RESIN INTO THE INFUSIBLE STATE
Rinse Dijkstra and Pieter Hans Pasman, Emmasingel, Eindhoven, Netherlands, assignors to North American Philips Company Inc., New York, N.Y., a corporation of Delaware
No Drawing. Filed Mar. 9, 1967, Ser. No. 621,790
Claims priority, application Netherlands, Mar. 19, 1966, 6,603,638
U.S. Cl. 260—47                 5 Claims
Int. Cl. C08g 43/00, 51/84

ABSTRACT OF THE DISCLOSURE

Use of diethylene tetramethylene-tetramine mixed with an aromatic compound containing at least one nuclear bound hydroxy group as harder for epoxy resins. An example is the epoxy resin formed from diphenylolpropane and epichlorohydrin mixed with p-nonylphenol and diethylene tetramethylene tetramine. This abstract is not intended to be a description of the invention defined by the claims.

---

This invention relates to a method of converting epoxy resins to the infusible state and to an infusible epoxy resin thus produced.

The term "epoxy resin" is to be understood in this connection to mean a polyglycidyl ether of a polyhydroxy compound. Epoxy resins sold commercially are obtained, for example, by causing epichlorohydrine to react with diphenylol-2-2-propane (bisphenol-A) in the presence of an alkali hydroxide. However, it is also possible to manufacture usable epoxy resins with other polyhydroxy compounds, such as novolaks, resins and aliphatic polyhydroxy compounds with the use of epichlorhydrine of other compounds containing epoxy groups.

Conventional epoxy resins contain more than one epoxy group per resin molecule.

It is known to produce hypolymeric hardened products by coupling the epoxy-resins molecules by means of substances containing two or more groups per molecule which are reactive with the epoxy groups. These substances which are commonly used in substantially stoichiometric amounts may be for example polyamides, polyamines, polysulphides, urea-formaldehyde resins, phenol-formaldehyde resins, melamine-formaldehyde resins and mono- or multi-nuclear aromatic compounds with two or more phenolically-bonded hydroxyl groups and acid anhydrides.

These coupling reactions, except with aliphatic polyamines generally progress quite slowly, unless accelerators are also added to the reactive mixture or the reactive mixture is heated.

Thus is is known, for example, to harden mixtures of epoxy resins and novolaks with the addition of a small amount of hexamethylene tetramine as the accelerator. Phenol and homologues thereof may aslo be used instead of a novolak. In the last-mentioned case, the products obtained upon hardening at room temperature are generally fusible below 100° C. During the hardening process, which takes place exothermally, the temperature of the product may exceed room temperature. If the product is hardened while heating, for example, to speed up the process, porous brittle products are obtained. The mechanical strength of these products is not particularly great. A three-dimensional molecular lattice is not formed upon hardening on account of the fusibility of these products.

An object of the invention is to overcome these disadvantages. It has been found that epoxy resins may be hardened, i.e. converted to the insoluble state at room temperature by means of a hardener system, consisting of a mono- or multi-nuclear aromatic compound containing at least one phenolically bonded hydroxyl group and diethylene tetramethylene tetramine, a product of condensation from 2 mols of ethylene diamine and 4 mols of formaldehyde. This compound contains no amino hydrogen Since optimum results are obtained with approximately stoichiometric quantities the system is to be regarded as a hardener system. If this hardener system is used in catalytic amounts (from 1 to 5% by weight), it is found to develop no or only low activity. According to the invention, the manufacture of a reactive mixture from an epoxy resin and a hardener system consisting of a mono- or multi-nuclear aromatic compound containing at least one phenolically-bonded hydroxyl group and a tertiary amine is characterized in that the tertiary amine used is diethylene-tetramethylene tetramine.

Diethylene-tetramethylene tetramine, referred to as DTT hereinafter, may be obtained by causing ethylene diamine to condense with formaldehyde, for example in an aqueous solution, in a molecular ratio of 1 to 2. This product if necessary settles after concentration of the solution and may be removed by filtration. This product has a melting point of approximately 196° C. and, insofar as is known, is not toxic or allergenic.

The reactive mixture according to the invention may be obtained with the use of a hardener system which consists of phenol or homologues thereof as a mono- or multi-nuclear aromatic compound containing at least one phenolically bonded hydroxyl group. However, per molecule, they must have at least one ortho position or para position with respect to the phenolically bonded hydroxyl group which is not occupied by a substituent. Such compounds are, for example: phenol, o-cresol, m-cresol, p-cresol, 2-4 dimethyl phenol, 3-4-dimethyl-phenol, 2-5-dimethylphenol, 3-5 dimethylphenol, 2-6-dimethyl phenol, catechol, resorcinol, hydroquinol, pyrogallol.

Also homologues carrying substituents other than a methyl group, for example, an ethyl group, a propyl group or other alkyl groups or halogens and nitro-groups can be used. Further, Cashew nutshell oil may be employed.

The hardener system may also contain so-called bisphenols such as diphenylol-2-2-propane.

Reactive mixtures may alternatively be manufactured with novolaks and resoles obtained by condensation of formaldehyde, with, for example, the aforementioned phenols.

To accelerate the hardening reaction at room temperature and also to obtain infusible final products, it is desirable to use preferably phenol or homologues having at least two ortho positions free of substituents other than hydrogen or one such free ortho position and one free para-position per molecule, for example, phenol-resorcinol, m-cresol, o-cresol, p-Kresol.

Mixtures reacting very quickly are obtained especially with resorcinol.

The hardening reaction may be accelerated, if desired, by moderately heating the reactive mixtures for a short period. It is also possible to speed up the hardening reaction by adding a small amount of resorcinol to the reactive mixture.

The term "equivalent weight epoxy compound" is to be understood hereinafter to mean: the quotient of the mean molecular weight of the epoxy-compound and the mean number of epoxy-groups per molecule. The term "equivalent weight phenol or homolog thereof" is to be understood to mean the quotient of the molecular weight thereof, and the mean number of reactive hydrogen atoms (ortho position and para position) per molecule.

The term "equivalent weight DTT" is to be understood to mean ¼ gm. mol.

The suitable ratio of the constituents in the reactive mixture is:

1 equivalent weight of DTT.
0.5 to 3 equivalent weights of a phenol or homologues thereof.
0.5 to 2 equivalent weights of an epoxy compound.

The use of the method yields products which are infusible after hardening.

The products obtained have a mechanical strength which is greater than that of products obtained by hardening with hexamethylene tetramine.

Reactive mixtures according to the invention may be used as cast resins, impregnating resins, lacquer binder, in moulding powders, as glue and in magnet wire lacquers. DTT is unlimitedly durable. It is not hygroscopic and does not react with water or $CO_2$. The properties of the hardened products may be influenced by the choice and the amount of the phenol or phenol homologues used.

The method according to the invention will now be explained in detail with reference to the following examples:

Example I.—Manufacture of a lacquer

A lacquer was manufactured from the following constituents:

246.6 g. of an epoxy resin produced from diphenylolpropane and epichlorohydrine (Epikote 1007) were dissolved in a mixture of:

300 g. of toluene and
335 g. of diacetonealcohol.

Then there was added to the clear yellow epoxy resin solution:

27.5 g. of p-nonylphenol.
7.0 g. of DTT.

If, after some time a phase separation occurred, diacetone alcohol was added to the lacquer solution while stirring, until the solution was clear again.

Objects of metal provided with a thin layer of the lacquer thus manufactured, were heated in a hot-air oven at 200° C. for 15 to 30 minutes. After cooling, a clear smooth lacquer layer was obtained having good electrical insulating and water-repellent properties. The lacquer layer withstands temperatures between −190° C. and +110° C.

A lacquer of similar quality may be obtained if the Epikote 1007 is replaced by 135.5 g. of Epikote 1004, a resin manufactured from propane diphenylol and epichlorohydrine.

Example II.—Manufacture of a lacquer suitable for covering metal wire with an insulating lacquer layer A lacquer solution was manufactured by dissolving the following constituents:

331.8 g. of Epikote 1007
37.0 g. of p-nonylphenol
9.4 g. of DTT in a mixture consisting of 283.4 g. of xylene and
283.4 g. of diacetone alcohol.

A copper wire, 120 microns thick, was provided with a lacquer layer until the wire+lacquer layer had a thickness of 137 to 138 microns.

After hardening of the lacquer the surface was found to be smooth and stiff. Upon drawing out slowly and upon drawing out rapidly, up to breaking tension no cracks occurred in the lacquer layer. The breakdown voltage in mercury was from 2100 volts to 2500 volts. The tan δ at 1500 kc./c. was from 0.033 to 0.035 and after 72 hours at 94% relative humidity from 0.036 to 0.042. Between 100° C. and 120° C., the lacquer layer commenced to soften and assumed a rubber-like character; fusion did not occur even upon heating to considerable temperatures.

Example III.—Manufacture of a casting mass or filling mass 13.5 g. of finely pulverized DTT
3.7 g. of resorcinol
22.4 g. of Kresol 50/55 were mixed to form a homogenous paste. Then 60 g. of aluminum-oxide powder and
60.3 g. of an epoxy resin (Araldit E)

were rapidly mixed with the paste.

The mass had to be worked up immediately after all the components have been mixed together. Hardening takes place within 20 to 40 minutes with evolution of heat.

Example IV.—Manufacture of a glue hardening at room temperature 3.3 g. of finely pulverized DTT
0.9 g. of Kresol 50/55
0.9 g. of resorcinol
15.2 g. of Araldit E
12 g. of aluminum oxide powder were mixed together to form a homogeneous adhesive paste. The mass hardened thoroughly at room temperature within 24 to 48 hours and at 65° C. within 15 to 30 minutes.

Example V.—Manufacture of a casting mass which, after hardening, has rubber-like properties A casting mass was manufactured by homogenously mixing a finely pulverized condensation product with 10.7 g. DTT
2.1 g. of resorcinol.
52.1 g. of cashew nutshell oil
55 g. of dolomite powder and
40 g. of Araldit E.

The hardened mass has rubber-like properties.

With regard to the constituents indicated by commercial names, or mark names in the examples, the following may be observed.

Spikote 1007 and Spikote 1004 are epoxy resins on the basis of diphenyl propane and epichlorohydrine. They have mean equivalent weights of approximately 1775 and 950 respectively and mean softening points of 130° and 100° C. respectively. The resin are supplied by Shell Nederland Chemie NV Araldit E (CY 232) and Araldit F (CY 205) are fluid epoxy resins on the basis of dephenylol propane and epichlorohydrine, having mean equivalent weights of approximately 170 and 190 respectively, and viscosities of 6–10 P and 150–250 P, respectively, at 20° C. They are supplied by the CIBA-Basel.

Kresol 50/55 is a technical mixture of cresoles which consist of approximately equal parts of metacresol and paracresol.

Cashew nut shell oil is a black-brown oil pressed from tropical nuts and consisting substantially of a mixture of cardanol and cardol; mean molecular weight is approximately 302.

Dolomite is $CaCO_3 \cdot MgCO_3$, a mineral filler.

What we claim is:

1. A method of converting an epoxy resin having an average of more than one vic-epoxide group per molecule into the infusible state which method comprises mixing and reacting said resin and a hardener system consisting of an aromatic compound having at least one free ortho or para position containing at least one phenolically-bounded hydroxyl group and diethylene-tetramethylene tetramine.

2. The method of claim 1 wherein for each equivalent weight of the diethylene tetramethylene tetramine there is employed about 0.5 to 3 equivalent weights of the aromatic compound and from about 0.5 to 2 equivalent weights of the epoxy resin.

3. The method of claim 1 wherein the aromatic compound contains at least one phenolically bounded hydroxyl group and two free ortho positions or one free ortho position and one free para position.

4. The method of claim 1 wherein resorcinol is added to the reactive mixture as an accelerator.

5. An infusible epoxy resin produced by the method of claim 1.

References Cited

UNITED STATES PATENTS 2,866,768  12/1958  Bolstad _____ 260—47 XR

WILLIAM H. SHORT, *Primary Examiner.*

T. D. KERWIN, *Assistant Examiner.*

U.S. Cl. X.R.

117—161; 260—2, 37, 46, 831